(12) United States Patent
Thomas et al.

(10) Patent No.: US 9,191,777 B2
(45) Date of Patent: Nov. 17, 2015

(54) CLIENTLESS METHOD FOR CONTEXT DRIVEN WIRELESS INTERACTIONS

(71) Applicant: AIRSENSE WIRELESS LTD., Carshalton Surrey (GB)

(72) Inventors: Edward R. Thomas, London (GB); David P. Thompson, Carshalton Surrey (GB); Alain C. Briancon, Poolesville, MD (US)

(73) Assignee: AIRSENSE WIRELESS LTD., London (GB)

( * ) Notice: Subject to any disclaimer, the term of this patent is extended or adjusted under 35 U.S.C. 154(b) by 0 days.

(21) Appl. No.: 14/161,451

(22) Filed: Jan. 22, 2014

(65) Prior Publication Data

US 2014/0206396 A1  Jul. 24, 2014

Related U.S. Application Data

(60) Provisional application No. 61/755,210, filed on Jan. 22, 2013.

(51) Int. Cl.
  *H04W 4/02*  (2009.01)
  *H04L 29/08*  (2006.01)
  *H04W 4/00*  (2009.01)

(52) U.S. Cl.
  CPC ............... *H04W 4/02* (2013.01); *H04L 67/02* (2013.01); *H04L 67/2814* (2013.01); *H04W 4/001* (2013.01)

(58) Field of Classification Search
  None
  See application file for complete search history.

(56) References Cited

U.S. PATENT DOCUMENTS

| | | | |
|---|---|---|---|
| 6,625,138 B2 * | 9/2003 | Karna et al. | 370/342 |
| 6,940,835 B2 * | 9/2005 | Reza et al. | 370/331 |
| 7,245,900 B1 * | 7/2007 | Lamb et al. | 455/404.1 |
| 7,418,485 B2 * | 8/2008 | Payrits | 709/220 |
| 7,529,850 B2 * | 5/2009 | Verma et al. | 709/242 |
| 7,768,955 B2 * | 8/2010 | Kang et al. | 370/313 |
| 7,826,830 B1 * | 11/2010 | Patel et al. | 455/414.1 |
| 7,890,146 B2 * | 2/2011 | Kang et al. | 455/566 |
| 8,583,777 B1 * | 11/2013 | Boyle et al. | 709/223 |
| 2003/0031165 A1 * | 2/2003 | O'Brien, Jr. | 370/352 |
| 2007/0214209 A1 * | 9/2007 | Maeda | 709/202 |
| 2010/0131593 A1 * | 5/2010 | Kihara et al. | 709/203 |
| 2013/0005296 A1 * | 1/2013 | Papakostas et al. | 455/405 |
| 2013/0143542 A1 * | 6/2013 | Kovvali et al. | 455/418 |
| 2014/0066014 A1 * | 3/2014 | Nicholson et al. | 455/411 |

* cited by examiner

*Primary Examiner* — Ashish K Thomas
(74) *Attorney, Agent, or Firm* — Volpe and Koenig, P.C.

(57) ABSTRACT

Described herein are methods and apparatuses for the provision and management of value added services without a requirement for specific client software on a wireless receive/transmit unit (WRTU). The methods and apparatuses described may be applied to wireless networks supporting HTTP transfers without disrupting the wireless network configuration. In the embodiments described herein, a web request may be received by a Service Management Entity (SME) that may be located in an access point (AP) from a WRTU. The SME may transmit a proxy auto-configuration (PAC) file to the WRTU. This PAC file may include a uniform resource locator (URL) associated with a Service Delivery Entity (SDE), and the URL chosen may be based on rules associated with a location of the WRTU. The SDE may then receive a second web request from the WRTU and respond by transmitting a message to the WRTU such as a transaction trigger.

20 Claims, 2 Drawing Sheets

CLIENTLESS METHOD FOR CONTEXT DRIVEN WIRELESS INTERACTIONS

CROSS REFERENCE TO RELATED APPLICATIONS

This application claims the benefit of U.S. Provisional Application Ser. No. 61/755,210 filed Jan. 22, 2013, the contents of which are hereby incorporated by reference.

BACKGROUND

Wireless receive/transmit units (WRTUs) such as cellular phones have been used primarily to receive voice calls and carry voice traffic and text (SMS) messages. Today, however, users use WRTUs to access information while on the go from a variety of different sources, such as the World Wide Web, application stores, and corporate resources. Smartphones, laptops, tablets, cameras, and sensors often include wide area 3G, 4G, LTE or other transceivers as well as WiFi transceivers. Advanced WRTUs (which use operating systems such as Apple's iOS, Android, and other advanced operating systems) require significant wireless network resources because of the large data traffic they generate. Some of the data-intensive tasks that may be performed on advanced WRTUs include web surfing, receiving and displaying web pages written in HTML5, downloading applications, downloading mapping elements and other geographic data, streaming of audio and video content, and video conferencing. The advent of social media and networks that allow users to check in, pin pictures, and upload all elements of their personal lives (even the most mundane details) require continual increases in available bandwidth.

Many WRTUs have the capability to support multiple air interfaces. For example, some WRTUs implement one or more "cellular" mobile technologies such as, but not limited to, UTMS, GSM, Edge, IS-95, WiFi, super-WiFi, WCDMA, TD-SCDMA, HSPDA, HSUDA, HSPA+, CDMA2000, IEEE 802.16 (Wimax), LTE, 3G, 4G, TD-LTE, and also implement "local" wireless technology such as Bluetooth, and Wireless Local Area Network (WLAN) technologies (such as those in the IEEE 802.11x family protocols, including 802.11a/b/g/n/af/ac).

WiFi (technologies in the IEEE 802.11 family) hot spots (also referred to as "WiFi hot spots", access points (APs), access point controllers (AP), or wireless access points (WAPs)) have become more and more prevalent in businesses and homes. Marketers, operators and consumers alike seek to have consistent services delivered across these different types of networks. Because, hot spot coverage may not be contiguous, WRTUs may roam in and out of coverage during the course of a day. Travelers using a WRTU may even roam through different time zones. Consistent service and marketing delivery has been difficult to achieve because when a WRTU moves to a business or enterprise hot-spot, registration may be controlled by a domain server, which may not be present at a private residence. Thus, service and marketing delivery is disrupted when a WRTU roams from a business or enterprise hot-spot to a home network. One limitation for providing advanced services to multi-RAT devices comes from the heterogeneous nature of the networks to which WRTUs such as smartphones may connect. To provide consistent, persistent services and marketing, client software has typically been downloaded in the WRTU to enable a server/managing node to interrogate the WRTU.

Geo-fencing is one example technique that may be used to trigger value-added services such as control of VPN or commercial offers. They may rely on a registration process or use of location derived from, for example, GPS, GLONASS, WiFi, Bluetooth, and other indoor and outdoor position technologies.

SUMMARY

Described herein are methods and apparatuses for the provision and management of value added services without a requirement for specific client software on a wireless receive/transmit unit (WRTU). The methods and apparatuses described may be applied to wireless networks supporting HTTP transfers without disrupting the wireless network configuration of wireless devices, radio access networks (RANs), and core networks (CNs). In the embodiments described herein, a web request may be received by a Service Management Entity (SME) that may be located in an access point (AP) from a WRTU. The SME may transmit a proxy auto-configuration (PAC) file to the WRTU. This PAC file may include a uniform resource locator (URL) associated with a Service Delivery Entity (SDE), and the URL chosen may be based on rules associated with a location of the WRTU. The SDE may then receive a second web request from the WRTU and respond by transmitting a message to the WRTU based on rules associated with the location of the WRTU. This message may be a transaction trigger and be based on parameters such as time of day.

BRIEF DESCRIPTION OF THE DRAWINGS

A more detailed understanding may be had from the following description, given by way of example in conjunction with the accompanying drawings wherein.

DETAILED DESCRIPTION

Certain terminology is used in the following description for convenience only and is not limiting.

The invention presented focuses on traffic operating on a single radio air interface technology (RAT). Nothing precludes the application of this invention to bandwidth or RAT aggregation, which is the case where traffic is handled by multiple channels of the same air interface technology or spread across multiple air interface technologies.

As used herein, wireless receive/transmit unit (WRTU) includes but is not limited to a wireless phone, a smartphone, a tablet, a personal computer, a Universal Serial Bus (USB) modem, a Personal Computer Memory Card International Association (PCMCIA) modem, a telemetry modem, a test modem, a camera, a user equipment (UE), a station (STA), a mobile station (MS), a subscriber terminal, a mobile terminal, and/or any other type of device capable of communicating in a wireless environment. WRTUs may include a receiver, transmitter, or transceiver. WRTUs may also include a processor that may be configured to perform any of the methods described herein and in accordance with any of the embodiments described herein.

As used herein, the terms access point (AP), access point controller (APC) and wireless access point (WAP), and WiFi hot spot may be used interchangeably.

As used herein, "connected" means that elements within the system are connected physically or through a remote connection such that they are functionally connected. This connection can be temporary or permanent. As a non-limiting example, a remote connection may be through a localized Radio Frequency link. It can also be a wire line connection through a dedicated network or the ubiquitous Internet.

The words "a" and "one," as used in the claims and in the corresponding portions of the specification, are defined as including one or more of the referenced item unless specifically stated otherwise. The phrase "at least one" followed by a list of two or more items, such as "A, B, or C," means any individual one of A, B or C as well as any combination thereof.

It is noted that, as used in this specification and the appended claims, the singular forms "a," "an," and "the" include plural referents unless expressly and unequivocally limited to one referent.

As used herein, the terms quality of service (QoS), throughput, effective bandwidth may be used interchangeably.

As used herein, transaction may be defined as an exchange involving at least two parties. For example, a purchase is a transaction. In another example, receipt of an incentive offer (such as the act of downloading an incentive offer or the act of rendering an offer on a terminal or cellphone), presentment of incentive offer, redemption of an incentive offer, and participation in a consumer survey are also transactions.

Figure 1:
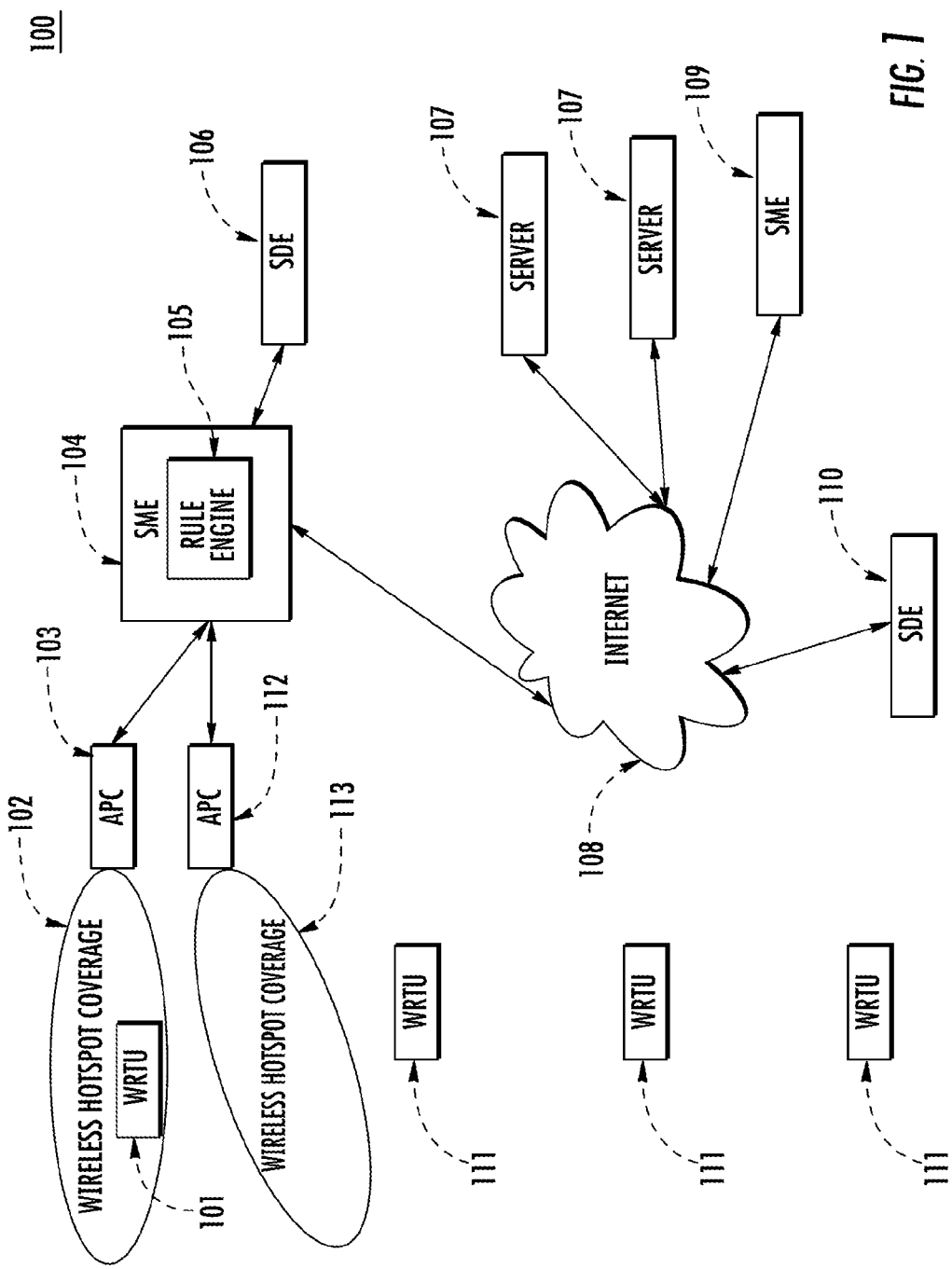
FIG. 1 is a high level system architecture diagram of a system in which a WRTU may receive triggered transactions and/or other messages.

FIG. 1 is a high level system architecture diagram 100 in accordance with an example embodiment. FIG. 1 illustrates a signal flow for obtaining information associated with a WRTU and transmitting triggered transactions and/or other messages to the WRTU based on rules associated with the location of the WRTU.

In the example of FIG. 1, WRTU 101 may be within the range of wireless hotspot coverage 102, which may be controlled by an access point controller (APC) 103. APC 103 may be managed by a Service Management Entity (SME) 104. SME 104 may include a rule engine 105. The SME 104 may also include a receiver, transmitter, or transceiver. The SME 104 may also include a processor that may be configured to perform any of the methods described herein and in accordance with any of the embodiments described herein.

SME 104 may determine under which conditions, WRTU 101 connecting to a specific APC such as APC 103 may be connected directly to a specific Service Delivery Entity (SDE) such as SDE 106. The SDE 106 may also include a receiver, transmitter, or transceiver. The SDE 106 may also include a processor that may be configured to perform any of the methods described herein and in accordance with any of the embodiments described herein.

The SDE may be connected to a series of servers 107 through the Internet 108. Another SME 109 may be connected to the Internet 108. SME 109 may be leveraged when WRTU 101 roams to another APC such as APC 112 or a group of access points (APs). SDE 110 may also be connected to the Internet 108 and accessible by any of the SMEs in the system. Other WRTUs 111 and APC 112 and wireless hotspot corresponding coverage 113 are also shown.

The methods and apparatuses described herein may be implemented by the combination of two functional entities: a Service Management Entity (SME) and a Service Delivery Entity (SDE) as shown in the example of FIG. 1. The SME and SDE may be located in the radio access network (RAN), the core network (CN), or in application servers connected thereto. For example the SME may be located in a RADIUS server, and the SDE may be located in a RADIUS server. The SME and SDE may also be located in the same server.

The methods and apparatuses described herein may also use the Proxy Auto-Configuration (PAC) file used to support hypertext transfer protocol (HTTP) or hypertext transfer protocol secure (HTTPS) on any browser or mobile application (app) using HTTP or HTTPS as a transport mechanism. A PAC file may define how an Internet browser or other applications using HTTP may automatically choose the appropriate proxy server for fetching a given uniform resource locator (URL). A PAC file may contain the JavaScript function "FindProxyForURL(url, host)" that may return a string with one or more access method specifications. These specifications cause the user agent inside the WRTU to use a particular proxy server or to connect directly.

There are multiple ways to provide a fallback when a proxy fails to respond as described in the method of the first embodiment. For example, the browser may fetch the PAC file before retrieving other pages. The URL of the PAC file may either be configured manually or determined automatically by the web proxy web auto-discovery protocol (WPAD). WPAD lets the browser guess the location of the PAC file through dynamic host configuration protocol (DHSCP) and domain name system (DNS) lookup. Once detection and download of the PAC file is complete, it may be executed to determine the proxy for a specified URL.

In accordance with the embodiments described herein, a SME may set the content of the PAC file used to set HTTP born communications. This may be done without changing the software in the WRTU and is thus backwards compatible with any WRTU. In one example embodiment, the SME may set its own address as the proxy server in the URL to trap requests from the WRTU. Logic may then be used to trigger specific activities.

In another embodiment the PAC File URL may also be hosted in the SDE, which may be an entity connected with SME. The SME may then set the SDE URL as the address of the proxy server to trap requests from the WRTU. Alternatively or additionally, the SDE may be at another location or be located in a mobile device. When the SDE receives an HTTP (or HTTPS) request from the WRTU, a variety of messages or transactions as defined above may be triggered or transmitted.

In one embodiment, the SME and SDE may be hosted in the same facility/computer or server.

In another embodiment, the SME and SDE may be different servers managed by different entities. The SME may authorize the SDE to perform its function and communicate said permissions. In embodiments in which the SME and SDE are in the same entity, the PAC file may include the URL or the SDE.

Figure 2:
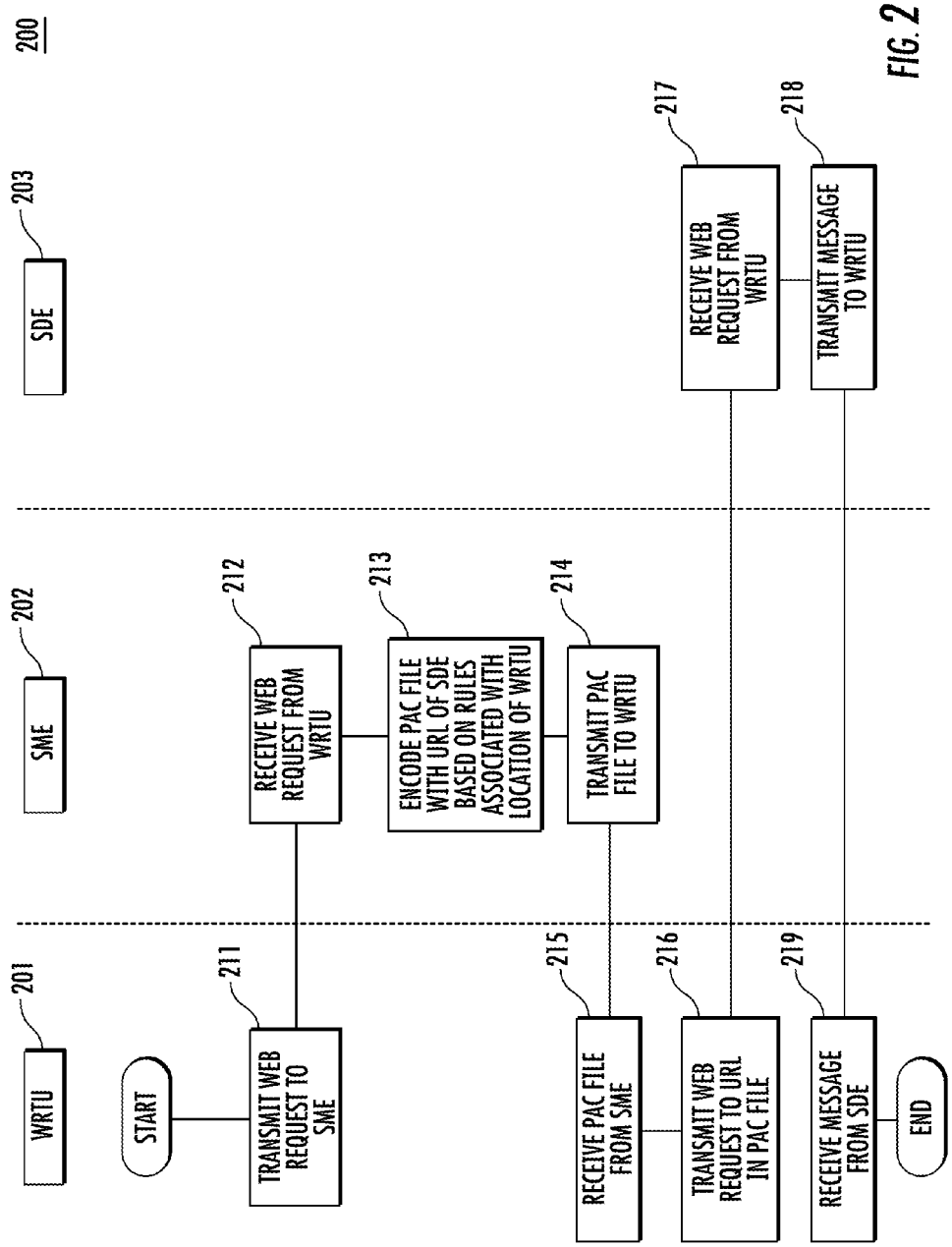
FIG. 2 is a diagram of a signal flow for an example procedure for delivering services and marketing to a WRTU implemented by the SME and SDE.

FIG. 2 is a diagram of a signal flow for an example procedure 200 for delivering services and marketing to a WRTU implemented by the SME and SDE. In the example procedure of FIG. 2, WRTU 201 may transmit a web request 211 to SME 202. SME 202 may then receive the web request from the WRTU 212. This web request may be an HTTP request such as a PAC file request event. SME 202 may then encode a PAC file with the URL of an SDE based on rules associated with the location of the WRTU 213. SME 202 may then transmit the PAC file to the WRTU 214. WRTU 201 may then receive the PAC file from the SME 215 and transmit a web request to the URL in the PAC file 216. SDE 203 may receive the web request from the WRTU 217. SDE 203 may then determine which transactions or messages to trigger based on rules associated with the WRTU location, and may then transmit the message to the WRTU 218. This message may include a transaction that was triggered by the SDE or a marketing promotion, for example. WRTU 202 may then receive the message from the SDE 219. For example, if the WRTU is located in a shopping mall, an HTTP request may be transmitted to the SDE via the SME and based on the location of the WRTU as determined by the AP used by the WRTU. The SDE may then determine which transactions or marketing messages to trigger based on the WRTU location such as retailers located near the WRTU or coupons/incentives marketed by retailers located near the WRTU. These messages may also be dependent on parameters such as time of day or time of week, for example.

In one embodiment, the SDE may also include logs and may store the HTTP(S) request events. The SDE may also map these request occurrences to an event code. This event code may include but is not limited to one of the following examples: a user activity codebook such as code 1 logging in, code 2 arriving at home, code 3 arriving at work, code 4 turning on coffee machine, code 5 leaving home, code 6 checking Facebook, etc. The SDE may then notify other connected systems of the event via the request occurrence or event code. Examples of other connected systems may include but are not limited to the SME itself or third party connected systems such as Authentication, Authorization, and Accounting (AAA) services of partners, data gatherers, content optimization technologies, business analytics, or the like.

In another embodiment, the SDE may extract additional information about the PAC file request event and may include metadata retrieved from other systems associated with the HTTP (or HTTPS) request. An example of additional metadata may include but is not limited to the following: the application currently in use on WRTU, the account balance of the WRTU owner, or the location of the AP in use. This metadata may be used by the recipient to optimize or modify content delivery, or may be simply stored for use at a later time or be used by another AP.

Another embodiment may involve multiple third parties such as social network services receiving notification about a connection event in a retail venue. The social network may notify other partners or advertisers that may use the information to hold a real-time auction or brokering for the right to use that event and its associated metadata.

In yet another embodiment, the SME may generate a plurality of PAC files, each associated with a different IP addresses. These PAC files may include the IP address and SSIDs of a series of hot spots. They may include not only commercial hot spots or the WRTU home network hotspot, but also hot spots in selected neighborhoods. For example, selected neighborhood may include hot spots in the general vicinity of the WRTU home spot.

In another embodiment, the SME may generate a plurality of PAC files, each associated with a different SSID network identification. These PAC files may include the IP address and SSIDs of a series of hot spots. They may include commercial hot spots, the WRTU home network hotspot, but also hot spots in selected neighborhoods (that is hot spots in the general vicinity of the WRTU home spot).

In another embodiment, the SME is part of an Authentication, Authorization, and Accounting Management Entity (AAAME) such as the one taught by Thompson et al. in U.S. Patent Application No. 61/579,761 and International Application No. PCT/US12/71540 to AirSense Wireless Ltd. The AAAME may manage access to one or more WiFi networks, such as, for example a collection of APs. For each network managed by the SME, it may generate a specific PAC file URL. When providing WiFi credentials and connection parameters, the SME may insert a PAC file URL.

In another embodiment, the SME may insert a PAC file when providing WiFi credentials and connection parameters to a WRTU to only update the credentials and connection parameters and may remove the PAC file as soon as, for example, it has been retrieved one or more times or after a period of time. An example of this embodiment may be the case of wanting to be notified of a WiFi session restarting at the same hotspot over time, or within a particular period of time.

In another embodiment, the SME may record the location of the hot spot where the connection has been detected and may maps this information to a time zone, allowing a third party server to take this information into account before sending a message or choosing to which application or account to push messages. For example, this may be used with a federated operation of hot spots such as that described in U.S. Patent Application No. 61/731,948 to Briancon et al. and U.S. patent application Ser. No. 14/092,685 to Briancon et al. An example of this embodiment may be the case of a commercial service that tailors which items, coupons, offers, and/or media to send to users.

In an yet another embodiment, the SME may set different PAC files for different access points associated with a contiguous coverage area. This may allow roaming based information to send back to the SME when the consumer moves. For example, when a user moves from the edge of a grocery store to the center of the grocery store specific coupons may be sent in accordance with the roaming based information.

In another embodiment, the SDE may query the SME about which specific actions may be associated with a specific consumer.

In another embodiment, the SME may set a different PAC file for a different AP that it believes may be co-located with a contiguous coverage area. This allows for mapping crowds. For example, at a sporting event or political rally, the SME may set different PAC files for APs that are co-located so that the crowd at the event may be mapped when users make web queries or HTTP (or HTTPS) requests.

In another embodiment, the SME may poll an application server to get an encryption key or equivalent information related to an application. This key may be used to generate a specific (and/or temporary) URL. This URL may be assigned to a specific server. The WRTU seeking to connect to this URL only at a specific hot spot may then be used as a two-factor authentication. This may be especially useful for gambling/gaming applications and location aware/event aware commerce and content customization.

In another embodiment, the SME may leverage the fact that PAC files are cacheable on the device that requests them. The SME may maintain a database tracking which WRTU has downloaded a PAC file URL. As a result, it may restrict how often a specific WRTU reports its registration process.

In another embodiment, the SDE may track the Internet Protocol (IP) address from the AP used by the WRTU. The SDE may also transmit the IP addresses of AP controllers to be managed by the SME in an internal registry.

In another embodiment, the SME may set the size of the PAC file to measure QoS on the managed networks as described in U.S. Patent Application No. 61/731,938 to Thomas et al. and International Application No. PCT/US13/72836 to AirSense Wireless Ltd.

In another embodiment, the SME may be used in a roaming scenario by communicating with another SME. An SME associated with the home network(s) of the WRTU may be referred to as the H-SME, the SME associated with the visited network may be referred to as the V-SME. The V-SME and H-SME may be in different countries for instance. If the V-SME does not recognize a WRTU attempting to register on one of the APCs it manages, it may interrogate the H-SME or H-SMEs (when there is more than one H-SME) to get the appropriate PAC files.

The references cited throughout this application, are incorporated for all purposes apparent herein and in the references themselves as if each reference was fully set forth. For the sake of presentation, specific ones of these references are cited at particular locations herein. A citation of a reference at a particular location indicates a manner(s) in which the teachings of the reference are incorporated. However, a citation of a reference at a particular location does not limit the manner in which all of the teachings of the cited reference are incorporated for all purposes.

It is understood, therefore, that this invention is not limited to the particular embodiments disclosed, but is intended to cover all modifications which are within the spirit and scope of the invention as defined by the appended claims; the above description; and/or shown in the attached drawings.

Although features and elements are described above in particular combinations, one of ordinary skill in the art will appreciate that each feature or element can be used alone or in any combination with the other features and elements. Although the solutions described herein consider 802.11 specific protocols, it is understood that the solutions described herein are not restricted to this scenario and are applicable to other wireless systems as well. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WRTU, UE, terminal, base station, RNC, or any host computer.

What is claimed is:

1. A method for providing services to a wireless receive/transmit unit (WRTU), the method comprising:
   receiving, by a service management entity (SME) located in an access point (AP), a first web request from the WRTU;
   transmitting, by the SME, a proxy auto-configuration (PAC) file to the WRTU, wherein the PAC file includes a uniform resource locator (URL) associated with a service delivery entity (SDE) based on rules associated with a location of the WRTU to enable trapping by the SDE of subsequent web requests from the WRTU;
   receiving, by the SDE, a second web request from the WRTU;
   determining, by the SDE, information associated with a transaction to transmit to the WRTU based on the location of the WRTU; and
   transmitting, by the SDE, the information associated with the transaction to the WRTU.

2. The method of claim 1, wherein the first web request is a PAC file request.

3. The method of claim 1, wherein the AP is SSID dependent.

4. The method of claim 1, wherein the AP is IP dependent.

5. The method of claim 1, wherein the SME is a RADIUS server.

6. The method of claim 1, wherein the SDE is a RADIUS server.

7. The method of claim 1, further comprising:
   transmitting, by the SDE, Internet Protocol (IP) addresses of AP controllers to be managed by the SME in an internal registry.

8. The method of claim 1, further comprising:
   granting, by the SME, permission by the SDE to transmit messages.

9. A server configured to provide services to a wireless receive/transmit unit (WRTU), the server comprising:
   a service management entity (SME) configured to receive a first web request from the WRTU;
   the SME further configured to transmit a proxy auto-configuration (PAC) file to the WRTU, wherein the PAC file includes a uniform resource locator (URL) associated with a service delivery entity (SDE) based on rules associated with a location of the WRTU to enable trapping by the SDE of subsequent web requests from the WRTU;
   the SDE configured to receive a second web request from the WRTU; and
   the SDE configured to determine information associated with a transaction to transmit to the WRTU based on the location of the WRTU; and
   the SDE further configured to transmit the information associated with the transaction to the WRTU.

10. The server of claim 9, wherein the first web request is a PAC file request.

11. The server of claim 9, wherein the SDE is a RADIUS server.

12. The server of claim 9, further comprising:
    The SME further configured to transmit Internet Protocol (IP) addresses of access point (AP) controllers to be managed in an internal registry.

13. A wireless receive/transmit unit (WRTU) configured to receive services from a network, the WRTU comprising:
    a transmitter configured to transmit a first web request to a service management entity (SME);
    a receiver configured to receive a proxy auto-configuration (PAC) file from the SME, wherein the PAC file includes a uniform resource locator (URL) associated with a service delivery entity (SDE) based on rules associated with a location of the WRTU to enable trapping by the SDE of subsequent web requests from the WRTU;
    the transmitter further configured to transmit a second web request to the URL associated with the SDE; and
    the receiver further configured to receive information associated with a transaction from the SDE, wherein the information associated with the transaction is determined to be transmitted based on the location of the WRTU.

14. The WRTU of claim 13, wherein the first web request is a PAC file request.

15. The WRTU of claim 13, wherein the SME is a RADIUS server.

16. The WRTU of claim 13, wherein the SDE is a RADIUS server.

17. The WRTU of claim 13, wherein the WRTU is a smartphone.

18. The method of claim 1, wherein the transaction is an incentive offer.

19. The server of claim 9, wherein the transaction is an incentive offer.

20. The WRTU of claim 13, wherein the transaction is an incentive offer.

\* \* \* \* \*